(12) United States Patent
Erickson et al.

(10) Patent No.: US 7,306,343 B2
(45) Date of Patent: Dec. 11, 2007

(54) IMAGE ROTATOR

(75) Inventors: David L. Erickson, Philomath, OR (US); Anurag Gupta, Corvallis, OR (US); Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 11/112,669

(22) Filed: Apr. 22, 2005

(65) Prior Publication Data

US 2006/0238718 A1   Oct. 26, 2006

(51) Int. Cl.
   *G03B 21/28*   (2006.01)

(52) U.S. Cl. .................. 353/98; 353/81; 353/122; 348/745; 349/57

(58) Field of Classification Search ............. 353/28, 353/37, 50, 51, 70, 77, 78, 81, 98, 99, 122; 348/746, 747, 745, 784, 785; 349/57; *G03B 21/28*
See application file for complete search history.

(56) References Cited

U.S. PATENT DOCUMENTS

| 5,191,485 | A | 3/1993 | Kahle |
| 5,467,152 | A | 11/1995 | Wilson |
| 5,657,160 | A | 8/1997 | Miyatake |
| 5,993,016 | A | 11/1999 | Mast |
| 6,364,491 | B1 * | 4/2002 | Okada et al. ............ 353/101 |
| 6,575,577 | B2 * | 6/2003 | Beliveau .................. 353/31 |
| 6,654,169 | B2 | 11/2003 | Appel |
| 7,104,652 | B2 * | 9/2006 | Kojima ..................... 353/33 |
| 2002/0008676 | A1 * | 1/2002 | Miyazaki et al. ........... 345/6 |
| 2002/0021419 | A1 * | 2/2002 | Yoder et al. .............. 353/71 |
| 2003/0122972 | A1 * | 7/2003 | Nelson et al. ............ 348/745 |
| 2005/0002001 | A1 * | 1/2005 | Yoon ...................... 353/119 |

FOREIGN PATENT DOCUMENTS

| DE | 29812018 | 9/1998 |
| JP | 06130353 | 5/1994 |
| JP | 08201915 | 12/1996 |

OTHER PUBLICATIONS

International Search Report for Application No. PCT/US2006/015181. Report issued Oct. 11, 2006.

* cited by examiner

*Primary Examiner*—Andrew T Sever

(57) ABSTRACT

One embodiment of an image rotator includes an image reversion structure that rotates an image by a predetermined number of degrees, and securement structure adapted to removably secure the image reversion structure on a projector.

4 Claims, 1 Drawing Sheet

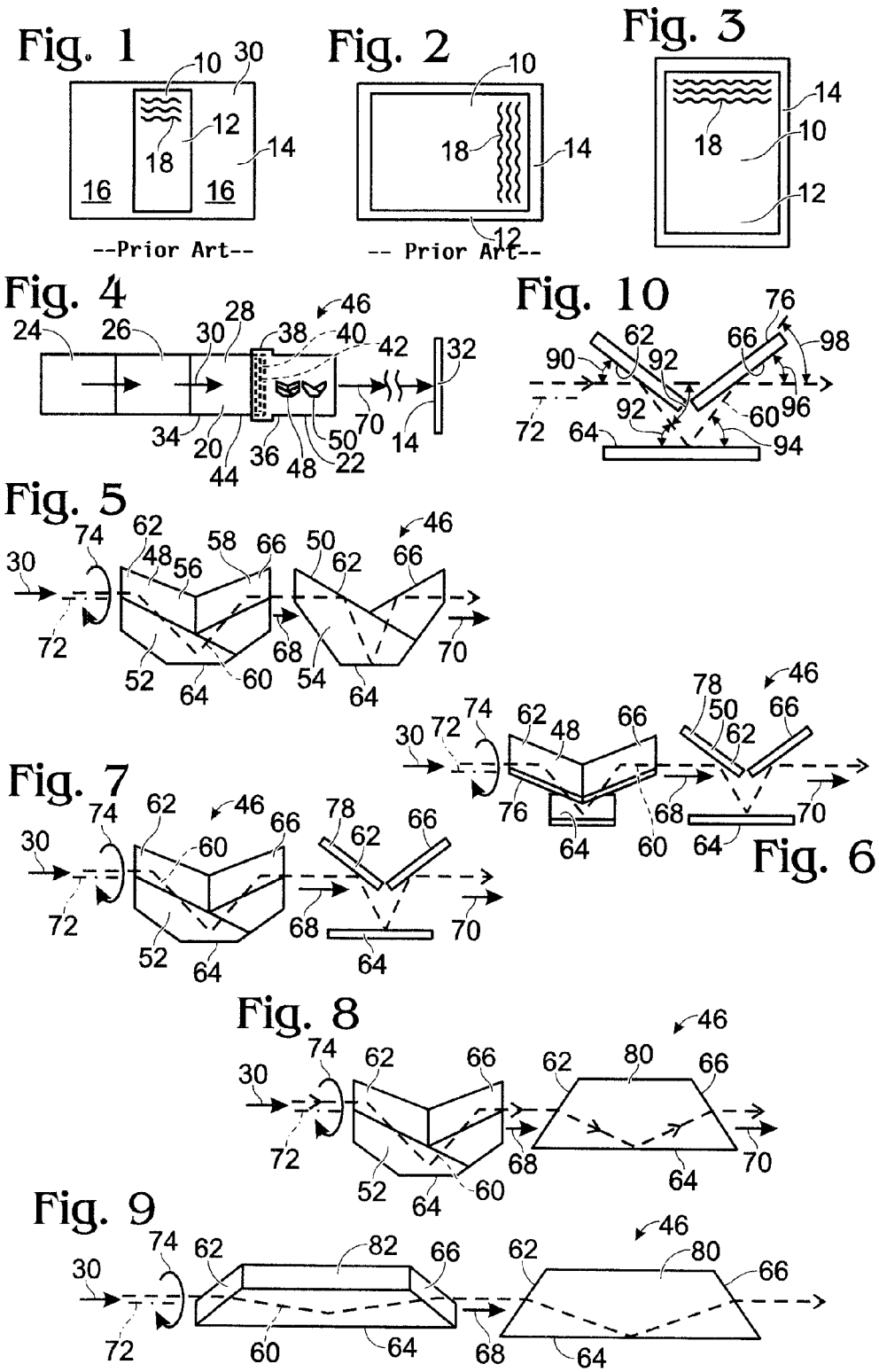

IMAGE ROTATOR

BACKGROUND

Projectors often project an image in landscape format, i.e., with the width of the image display area being larger than the height of the image display area. This landscape format may be useful in many situations, such as when projecting a movie, but may not be efficient when projecting text material that may be stored in a portrait format, i.e., with the width of the image display area being smaller than the height of the image display area. One solution to show the text in portrait format is to physically rotate the entire projector by ninety degrees. This option may not be feasible due to the bulk or shape of the projector body. Another solution may be to rotate the projection lens. This option may not be feasible in cases where the projection lens is not centered on the projection path, in which case the image may be moved off the viewing screen when the projection lens is rotated.

BRIEF DESCRIPTION OF THE DRAWINGS

FIG. 1 is a schematic front view of one embodiment of a text document that fills a portion of a display area and is displayed in a landscape format.

FIG. 2 is a schematic front view of one embodiment of a text document that fills an entire display area and is displayed in a landscape format.

FIG. 3 is a schematic front view of one embodiment of a text document that fills an entire display area and is shown in a portrait format, utilizing one embodiment of an image rotator.

FIG. 4 is a schematic side view of one embodiment of a projection device including one embodiment of an image rotator.

FIG. 5 is a schematic side view of one embodiment of an image rotator including two reversion prisms.

FIG. 6 is a schematic side view of one embodiment of an image rotator including two K mirrors.

FIG. 7 is a schematic side view of one embodiment of an image rotator including a reversion prism and a K mirror.

FIG. 8 is a schematic side view of one embodiment of an image rotator including a reversion prism and a Dove prism.

FIG. 9 is a schematic side view of one embodiment of an image rotator including a set of Dove prisms.

FIG. 10 is a schematic side view of an image rotator showing a projection path through the image rotator.

DETAILED DESCRIPTION OF THE DRAWINGS

FIG. 1 is a schematic front view of one embodiment of a page 10 of a text document 12 that fills a portion of a display area 14 and is displayed in a landscape format. Accordingly, page 10 may be only a component of the entire image 30 displayed on display area 14. In this landscape format page 10 takes up approximately one third of display area 14 such that regions 16 on either side of page 10 are not utilized.

FIG. 2 is a schematic front view of one embodiment of page 10 of text document 12 that is displayed in a landscape format and that fills approximately an entirety of image 30 displayed on display area 14. Rotation of page 10 from the portrait format (shown in FIG. 1) to the landscape format shown in FIG. 2 may be accomplished in a variety of ways. In one example, page 10 may be rotated within the a data stream by an optical modulator. In this landscape orientation, page 10 may be shown in a larger size than the page shown in the landscape format of FIG. 1. However, in this view page 10 within display region 14 is rotated ninety degrees such that text 18 on page 10 may not be easily read. The display area 14 shown in FIG. 2, with page 10 shown sideways and in a landscape format, may be a common representation of a display area 14. It may be desirable to rotate image 30, with page 10 shown therein, so that an observer may easily read the text 18 of page 10.

FIG. 3 is a schematic front view of one embodiment of page 10 of text document 12 that fills approximately an entirety of image 30 displayed on display area 14, wherein image 30 is shown in a portrait format, utilizing one embodiment of an image rotator (not shown). In this view, image 30 of FIG. 2 has been rotated by an image rotator such that text 18 may be easily read.

FIG. 4 is a schematic side view of one embodiment of a projection device 20 including one embodiment of an image rotator 22 secured thereto. In the embodiment shown, projection device 20 may include a light source 24, a display source 26, and a projection lens 28, for example. In other embodiments, different components of projection device 20 may be utilized. Light source 24 may be a tungsten filament, a mercury arc lamp, a Xenon arc lamp, a light emitting diode, a laser, or any other light source that may be utilized for a particular application. Display source 26 may be an optical modulator, such as a digital micro-mirror modulator, a liquid crystal display, a liquid crystal on silicon display, or any other display source that may be utilized for a particular application. Projection lens 28 may be a focusing lens set that may be automatically or manually adjusted, or may be any other lens set utilized to project an image 30 within a display area 14 from display source 26 to a screen 32 for viewing by an observer, or for projecting an image directly to an observer (not shown).

In the embodiment shown, projection lens 28 may include a cylindrical body 34 and image rotator 22 may include a cylindrical body 36 having an end region 38 sized to be frictionally secured around an exterior of body 34 of projection lens 28. Body 34 of projection lens 28 may further include threads 40 and body 36 of image rotator 22 may include mating threads 42. Threads 40 of projection lens 28 may mate with threads 42 of image rotator 22 such that image rotator 22 may be threadingly secured to body 34 of projection lens 28. In other embodiments non-cylindrical projection lenses and or bodies 36 may be utilized. In other embodiments image rotator 22 may be secured to projection lens 28 by any securement structure adapted to releasably secure image rotator 22 thereto. Accordingly, image rotator 22 may be releasably secured to an exterior, end region 44 of projector 20 such that image rotator 22 may be releasably secured to projection device 20 when an observer desires to rotate display area 14 (see FIG. 1) and any image displayed thereon.

Still referring to FIG. 4, image rotator 22 may include an image rotation system 46 that may include, for example, first and second reversion systems 48 and 50 positioned within body 36, as will be described in more detail below. In general, a reversion system may be defined as a system that projects a mirror image of an input image, and which is adapted to rotate an image about a projection axis by any predetermined angle as may be desired.

FIG. 5 is a schematic side view of one embodiment of image rotation system 46. In this embodiment, system 46 includes a set of reversion prisms 52 and 54. Prisms 52 and 54 may be manufactured of any suitable material, such as glass or plastic, for example. First reversion prism 52 may include a first prism 56 and a second prism 58 that define an image or projection path 60 (indicated in dash lines) that passes through first reversion prism 52 in a "V" shape, internally reflecting off first, second a third reflection surfaces 62, 64 and 66. Reflection surfaces may be surfaces coated with a reflective material such as aluminum, silver, or the like. Reflection of image 30 off three reflection surfaces 62, 64 and 66 will result in reversion of image 30 such that a mirror image 68 of image 30 is projected from first reversion prism 52. Second reversion prism 54 has substantially the same size and shape and first reversion prism 52, including first, second a third reflection surfaces 62, 64 and 66, such that second reversion prism 54 projects a mirror image 70 of mirror image 68. In other words, second reversion prism 54 reverses the reversal of image 30 such that second mirror image 70 projected by second reversion prism 54 is substantially similar to original image 30 and is a mirror image of first mirror image 68.

First reversion prism 52 may be rotated about a projection axis 72 in a direction 74 by approximately forty-five degrees, which will result in rotation of image 30 about projection axis 72 by approximately ninety degrees. The number of degrees of rotation of prism 52 may be measured from a zero position in which a lower surface 62 of prism 52 is positioned in a horizontal plane, as shown by the position of prism 54 in FIG. 5. In general, a reversion prism will rotate an image by an amount approximately twice the amount of the rotation of the prism. Accordingly, image 68 projected by first reversion prism 42 will be rotated about projection axis 72 by approximately ninety degrees. Second reversion prism 54 may not be rotated about projection axis 72 such that image 68 projected to second reversion prism 54 will not be rotated and such that image 70 projected from second reversion prism 54 will not be rotated with respect to the position of image 68.

In another embodiment, each of reversion prisms 52 and 54 may be rotated an amount to define a desired rotation of image 30. In one example, first reversion prism 52 may be rotated 20 degrees and second reversion prism 54 may be rotated 25 degrees such that image 30 is rotated ninety degrees after passage through both of prisms 52 and 54. In another embodiment, first reversion prism 52 may not be rotated and second reversion prism 54 may be rotated forty five degrees such that image 30 is rotated ninety degrees after passage through both prisms 52 and 54. Of course, other degrees of rotation, besides a rotation of image 30 of ninety degrees, may be achieved by positioning either of reversion systems 48 and 50 in any rotational position as is desired. In this manner, use of two reversion prisms 52 and 54, one rotated approximately forty five degrees and the other not rotated, will result in a ninety degree rotation of image 30 as projected to screen 32, with final image 70 being substantially identical to image 30, i.e., not a mirror image of image 30.

Each of reversion systems 48 and 50 may be adjustably positioned or fixedly positioned within body 36 of image rotator 22. In the fixed condition the two reversion systems may be fixedly positioned to rotate a display area 14 (see FIG. 1) by ninety degrees. In the adjustable embodiment, the two reversion systems may be rotated with respect to one another and with respect to body 36 such that an operator may adjust the amount of rotation of display area 14 (see FIG. 1) as may be desired for a particular application.

FIG. 6 is a schematic side view of one embodiment of an image rotator 22 wherein first and second reversion systems 48 and 50 are two "K mirrors" 76 and 78. Each of K mirrors 76 and 78 may include three internal reflection surfaces 62, 64 and 66. K mirrors may be called "K mirrors" due to the position of each of surfaces 62, 64 and 66 with respect to one another, i.e., the three mirrors are positioned in the shape of a "K." Reflection of image 30 off three reflection surfaces 62, 64 and 66 will result in reversion of image 30 such that a mirror image 68 of image 30 is projected from first K mirror 76. Second K mirror 78 has substantially the same size and shape and first K mirror 76, including first, second a third reflection surfaces 62, 64 and 66, such that second K mirror 78 projects a mirror image 70 of mirror image 68. In other words, second K mirror 78 reverses the reversal of image 30 such that second mirror image 70 projected by second K mirror 78 is substantially similar to original image 30 and is a mirror image of first mirror image 68.

Similar to a reversion prism, first K mirror 76 is rotated about projection axis 72 by approximately forty-five degrees in direction 74 such that the K mirror rotates image 30 in direction 74 by approximately ninety degrees. Rotation of K mirror 76 other degree increments about axis 74 will result in rotation of image 30 about axis 74 by a corresponding amount, namely, by an amount substantially double the amount of the rotation of the K mirror. A K mirror may be preferred to a reversion prism when it may be preferred that projection path 60 extend through air rather than through a prism material such as the material utilized to manufacture prisms 52 and 54 (see FIG. 5).

FIG. 7 is a schematic side view of one embodiment of an image rotator 22 wherein first reversion system 48 is a reversion prism 52 and second reversion system 50 is a K mirror 78. Image rotator 22 shown in FIG. 7 will function in the same manner as the rotators 22 shown in FIGS. 5 and 6 due to the position of reflection surfaces 62, 64 and 66.

FIG. 8 is a schematic side view of one embodiment of an image rotator 22 including a reversion prism 52 and a Dove prism 80. Dove prism 80 may include three redirection surfaces 62, 64 and 66, similar in shape and position as the reflection surfaces in reversion prisms 52 and 54 (see FIG. 5), and in K mirrors 76 and 78 (see FIG. 6). In particular, surface 64 is a reflective surface and surfaces 62 and 66 are refractive surfaces. Dove prism 80 also functions in the same manner as a reversion prism and a K mirror because a Dove prism will rotate an image by an amount double the amount of rotation of the Dove prism. Dove prism 80 will also produce a mirror image of an image projected to the Dove prism. The dove prism may be manufactured of any suitable material, for example, plastic or glass.

FIG. 9 is a schematic side view of one embodiment of an image rotator 22 including a set of Dove prisms 80 and 82. Each of Dove prisms 80 and 82 include three internal redirection surfaces 62, 64 and 66, so as to define a "V" shaped projection path 60 through the two Dove prisms. Dove prism 82 is rotated approximately forty-five degrees about projection axis 72 in direction 74 so that image 30 will be rotated by Dove prism 82 and so that Dove prism 82 will project image 68 which is rotated by approximately ninety degrees about axis 72 with respect to image 30.

FIG. 10 is a schematic of the position of reflection surfaces 62, 64 and 66 of one embodiment of a reversion system. In general, each of reversion prisms 52 and 54 (see FIG. 5), each of K mirrors 76 and 78 (see FIG. 6), and each of Dove prisms 80 and 82 (see FIG. 9) may be referred to as a reversion system 46. As stated earlier, a reversion system may be defined as a system that projects a mirror image of an input image, and which is adapted to rotate an image about a projection axis by any predetermined angle as may be desired. In the embodiments shown, each of the reversion systems may have three internal reflection surfaces 62, 64 and 66. In the embodiments of the reversion prisms and the K mirrors, first reflection surface 62 may be defined as being positioned at a non-perpendicular angle 90 with respect to projection axis 72 such that a projection path 60 is bent at an acute angle 92 from projection axis 72. Second reflection surface 64 may be defined as being positioned parallel to projection axis 72 such that projection path 60 is bent at an angle 94 with respect to surface 64, wherein angle 94 is less than 180 degrees, and wherein angle 94 is substantially the same as acute angle 92. Third reflection surface 66 may be defined as being positioned at a non-perpendicular angle 96 with respect to projection axis 72 such that projection path 60 is bent at an acute angle 98 as to be aligned with projection axis 72, wherein angle 96 will generally be substantially the same as angle 90. In other embodiments, reversion system 46 may include an Abbe prism and/or a Pechan prism.

Accordingly, in the embodiments shown, each reversion system 46 (see FIG. 5) may be described as providing a projection path 60 that is generally "V" shaped. More generally, each reversion system 46 provides an inversion or mirror image of the image received by the reversion system 46, and the image may be rotated by the reversion system 46 any amount, such as approximately double the amount of rotation of the reversion system 46 about a projection axis 72 extending through the reversion system.

Referring still to FIG. 10, in one embodiment image 30 entering reversion system 46 may be reversed by the display source 26 (see FIG. 4) prior to entering reversion system 46. For example, image 30 may be reversed electronically by a spatial modulator, such as a digital micro-mirror device, wherein the modulator performs a mirror image reversal of the image within a data stream. In such an embodiment, image rotator 22 may comprise a single reversion system, such as a reversion prism 52 (see FIG. 5), a dove prism 80 (see FIG. 9), or a K mirror 76, such as shown in FIG. 10. In this embodiment, image 30 is reversed prior to entering reversion system 46. The reversion system them produces a mirror image of the image projected to the reversion system, thereby producing second mirror image 70 for viewing by an observer. A single reversion system may be utilized because the reversion system only flips the image once, and not twice. The single reversion system may be rotated approximately forty-five degrees such that the final image 70 is rotated by ninety degrees.

Other variations and modifications of the concepts described herein may be utilized and fall within the scope of the claims below.

We claim:

1. An image rotator, comprising:
   an image reversion structure that rotates an image by a predetermined number of degrees; and
   a securement structure adapted to removably secure said image reversion structure on a projector lens housing, wherein said securement structure is adapted to be removably secured to an exposed, exterior end region of said projector lens housing, and wherein said securement structure comprises threads adapted to mate with mating threads on said projector lens housing.

2. The image rotator of claim 1 wherein said image reversion structure includes at least three internal reflection surfaces.

3. The image rotator of claim 1 wherein said image reversion structure includes a first structure and a second structure, wherein each of said first and second structures are chosen from one of a reversion prism, a K mirror and a Dove prism.

4. The image rotator of claim 1 wherein said image reversion structure includes a first structure and a second structure, and wherein said first structure is rotated about a projection axis of said apparatus by a first degree amount and said second structure is rotated about said projection axis of said apparatus by a second degree amount, and wherein said first and said second degree amount together comprise substantially forty-five degrees.

* * * * *